(12) United States Patent
Clarke

(10) Patent No.: US 9,760,736 B2
(45) Date of Patent: Sep. 12, 2017

(54) CPU OBFUSCATION FOR CLOUD APPLICATIONS

(71) Applicant: International Business Machines Corporation, Armonk, NY (US)

(72) Inventor: Michael Paul Clarke, Ellenbrook (AU)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 14/868,572

(22) Filed: Sep. 29, 2015

(65) Prior Publication Data

US 2017/0091486 A1    Mar. 30, 2017

(51) Int. Cl.
*G06F 21/62* (2013.01)
*G06F 21/14* (2013.01)
*H04L 9/08* (2006.01)

(52) U.S. Cl.
CPC .......... *G06F 21/6281* (2013.01); *G06F 21/14* (2013.01); *G06F 21/62* (2013.01); *G06F 21/6209* (2013.01); *G06F 2221/0724* (2013.01); *H04L 9/0877* (2013.01)

(58) Field of Classification Search
CPC ...... G06F 21/6281; G06F 21/14; G06F 21/62; G06F 21/6209; G06F 2221/62
See application file for complete search history.

(56) References Cited

U.S. PATENT DOCUMENTS

| | | | |
|---|---|---|---|
| 6,334,189 B1 * | 12/2001 | Granger | G06F 21/123 380/255 |
| 7,730,542 B2 | 6/2010 | Cronce | |
| 2003/0023859 A1 * | 1/2003 | Kiddy | G06F 21/14 713/189 |
| 2005/0204348 A1 * | 9/2005 | Horning | G06F 21/14 717/140 |
| 2006/0271921 A1 * | 11/2006 | Cronce | G06F 21/14 717/151 |

(Continued)

FOREIGN PATENT DOCUMENTS

WO    WO2015058639 A1    4/2015

OTHER PUBLICATIONS

Mel and Grance, The NIST Definition of Cloud Computing, Sep. 2011, pp. M-6 to M-13.

*Primary Examiner* — Hadi Armouche
*Assistant Examiner* — Sher A Khan
(74) *Attorney, Agent, or Firm* — Jeffrey LaBaw; Gail Zarick; Diana R Gerhardt

(57) ABSTRACT

A cloud deployment system is used for obfuscating CPU operation codes in a set of machines operating in a distributed computing environment. A reprogrammable microcode replaces a hardware instruction set, the microcode layer containing a set of original operation codes. A first transform of the set of original operation codes produces a first set of transformed operation codes. A first transformed microcode is created which incorporates the first set of transformed operation codes instead of the original operation codes. An operating system and an application is compiled using the first set of transformed operation codes to produce a first cross compiled operating system and application. The first transformed microcode, the first cross compiled operating system and application are deployed to a respective first one of the set of machines, the first one of the machines equipped with a softcore processor.

16 Claims, 7 Drawing Sheets

(56) References Cited

U.S. PATENT DOCUMENTS

| | | | |
|---|---|---|---|
| 2010/0180104 A1* | 7/2010 | Henry | G06F 8/66 |
| | | | 712/208 |
| 2011/0035601 A1* | 2/2011 | Davidson | G06F 21/14 |
| | | | 713/190 |
| 2013/0145128 A1* | 6/2013 | Schardt | G06F 9/3851 |
| | | | 712/215 |
| 2013/0311993 A1* | 11/2013 | Benedetti | G06F 8/37 |
| | | | 718/1 |
| 2015/0161363 A1* | 6/2015 | Mallon | G06F 21/125 |
| | | | 726/26 |
| 2016/0253189 A1* | 9/2016 | Teuwen | G06F 8/74 |
| | | | 726/22 |

* cited by examiner

CPU OBFUSCATION FOR CLOUD APPLICATIONS

BACKGROUND OF THE INVENTION

Technical Field

This disclosure relates generally to deploying applications in a distributed computing environment. More specifically, it relates to hardening servers in a cloud environment, or otherwise, from malicious attacks by obfuscating the CPUs instruction set.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud computing resources are typically housed in large server farms that run network applications. Although these resources are often provisioned via a virtualized architecture wherein applications run inside virtual servers, or so-called "virtual machines" (VMs), that are mapped onto physical servers in a data center facility one embodiment of this invention is primarily aimed at the portion of the market where a cloud consumer buys direct and singular access to the physical hardware. The virtual machines typically run on top of a hypervisor, which is a control program that allocates physical resources to the virtual machines. While this invention can be used with a hypervisor, there are some restrictions.

Software is never 100% safe, as new defects and vulnerabilities are discovered every day. Cloud application packages are no different; indeed, often just a few days after an application package has been published into the cloud, it may already contain new vulnerabilities. Security and resistance to untargeted attacks, such as viruses, Trojans and worms, is an issue on cloud servers. In a server farm, the individual machines are typically replicas of one another. Thus, if there is a flaw in the replicated servers' defenses, a successful intrusion on one machine can infect or take over all copies of it in the cloud environment. The similarity of the servers also permits hackers who obtain access to or a dump of one server to work out how to attack other servers running the same application. While current cloud solutions provide numerous advantages, there remains a need to address the problem of deploying applications that can be exploited by later-discovered or post-deployment vulnerabilities or other defects.

BRIEF SUMMARY

According to this disclosure, a deployment system is used for obfuscating CPU operation codes in a set of machines operating in a distributed computing environment. A reprogrammable microcode replaces a hardware instruction set, the microcode layer containing a set of original operation codes. A first transform of the set of original operation codes produces a first set of transformed operation codes. A first transformed microcode is created which incorporates the first set of transformed operation codes instead of the original operation codes. An operating system and an application is compiled using the first set of transformed operation codes to produce a first cross compiled operating system and application. The first transformed microcode, the first cross compiled operating system and application are deployed to a respective first one of the set of machines, the first one of the machines equipped with a softcore processor.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
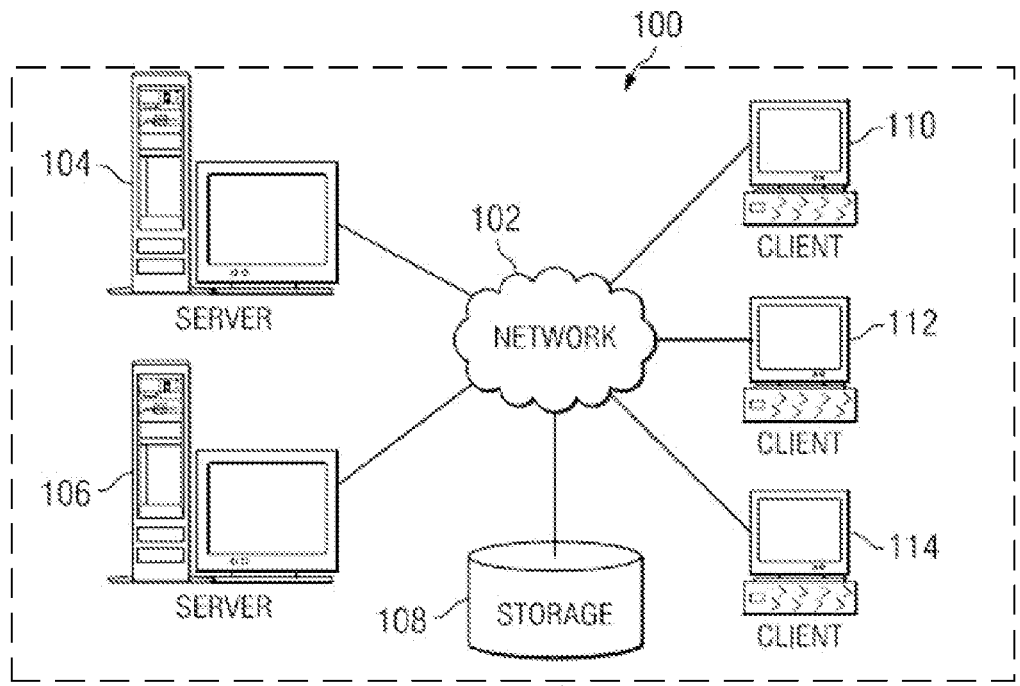
FIG. 1 depicts an exemplary block diagram of a distributed data processing environment in which exemplary aspects of the illustrative embodiments may be implemented.
Figure 2:
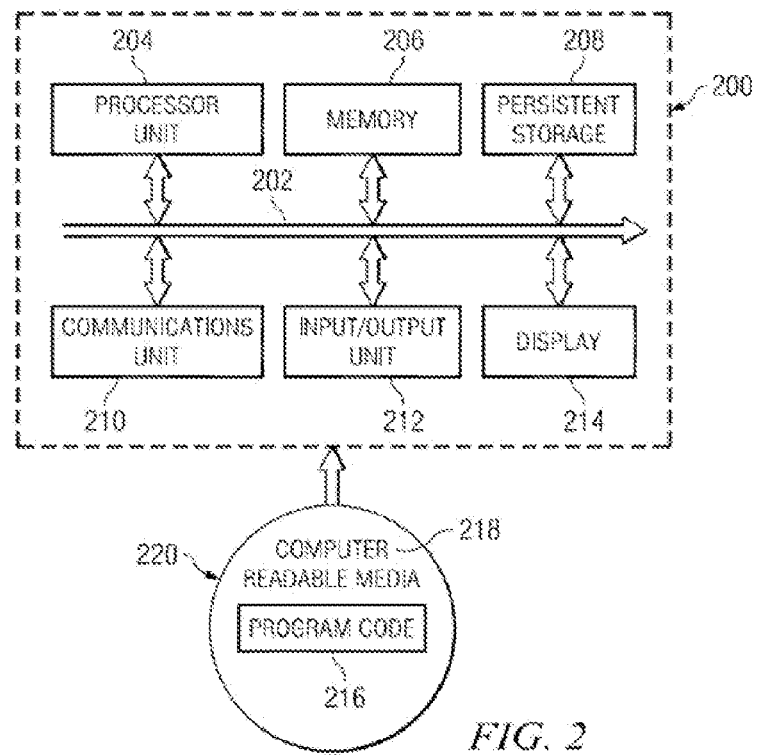
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3A:
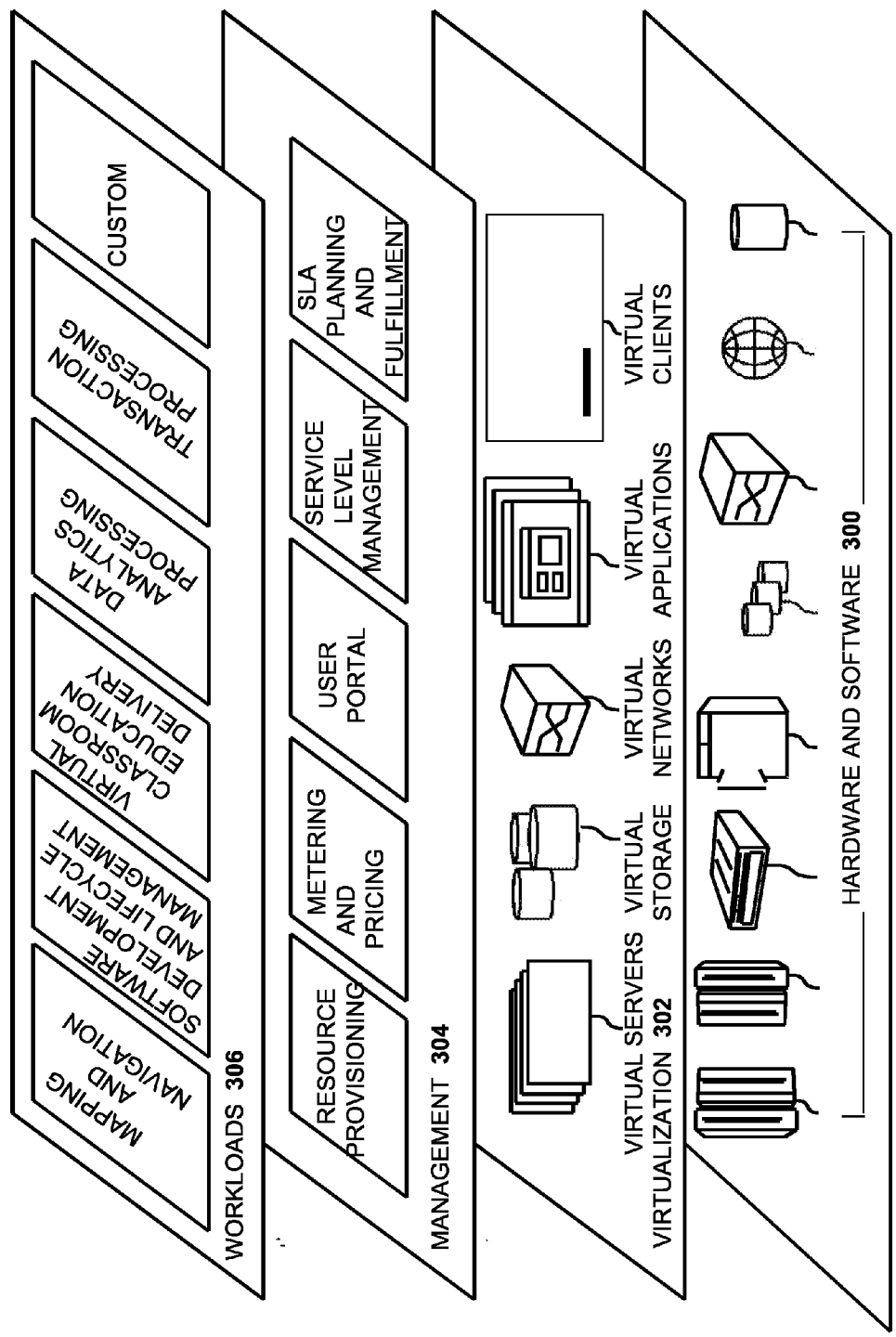
FIG. 3A illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Microcode

Figure 3B:
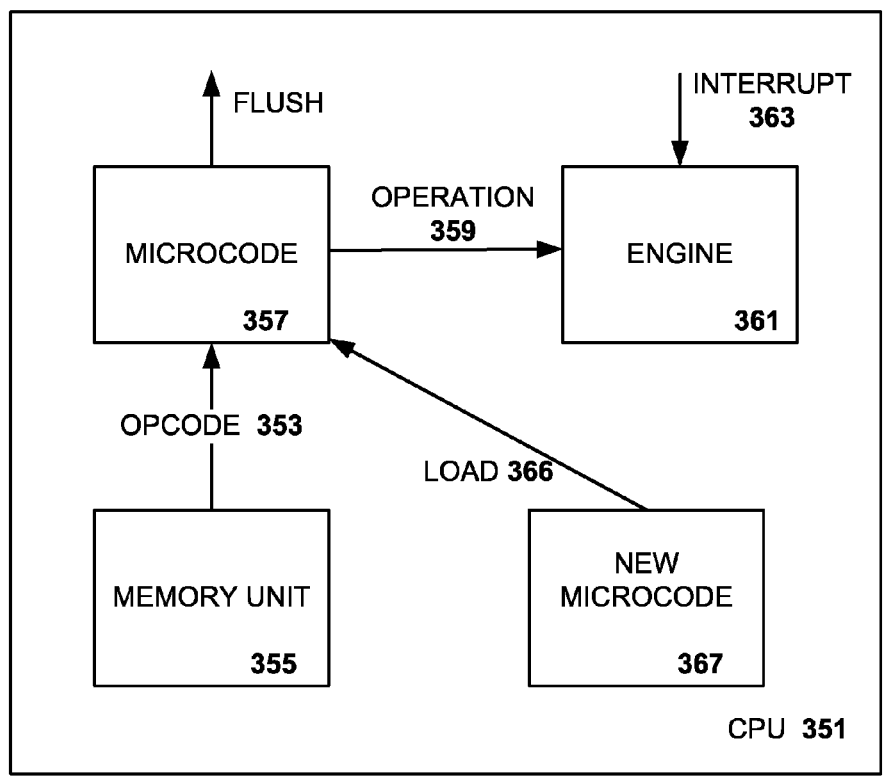
FIG. 3B illustrates the relationship between a CPU's external instructions set, its microcode and its internal processing for a chip with reprogrammable microcode.

FIG. 3B. shows a representation of a chip with reprogrammable microcode. When the CPU 351 is operating normally, operation codes 353 for execution are fetched from the memory address in the memory unit 355 pointed at by the instruction pointer. The opcode 353 is then processed by the microcode 357 to produce a series of one or more basic operations 359 that the engine 361 will perform.

When the microcode reload interrupt 363 is triggered, the CPU 351 suspends execution, flushes its existing microcode 357 and starts loading 366 new microcode 367 that is presented to it. When the load is complete, it reboots and resumes normal operations. One skilled in the art would appreciate that this is existing technology for reprogrammable chips, e.g., EPROMs and CPUs with reprogrammable microcode. The invention uses the technology to generate a microcode layer and a matching cross compiler. The generated microcode is deployed to the target cloud machines as well as a system image built by the cross compiler that will use the microcode to execute—and which can only be executed with that microcode.

Cloud Deployment Technologies

In one preferred embodiment of the invention, the invention is implemented in cloud provisioning wherein racks of physical machines are managed. In this environment, a tenant can buy exclusive use of a given physical machine. Such cloud services are offered by IBM SoftLayer, Rackspace and other cloud vendors. In this embodiment of the invention, the physical machines hired to run obfuscated applications preferably have special CPUs that allow for reprogrammable microcode to be installed. Typically, a customer would hire normal machines for application build and test and only use obfuscated machines for the production service. Although, in other embodiments of the invention, all machines hired by the tenant would have the special CPUs. In this embodiment, the 'load microcode' service would be externalized by the cloud service providers in much the same way that the 'load system image' service is.

It is known to provide an appliance-based solution to facilitate rapid adoption and deployment of both Infrastructure and Platform as a Service offerings. One such appliance is IBM Workload Deployer (IWD), and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
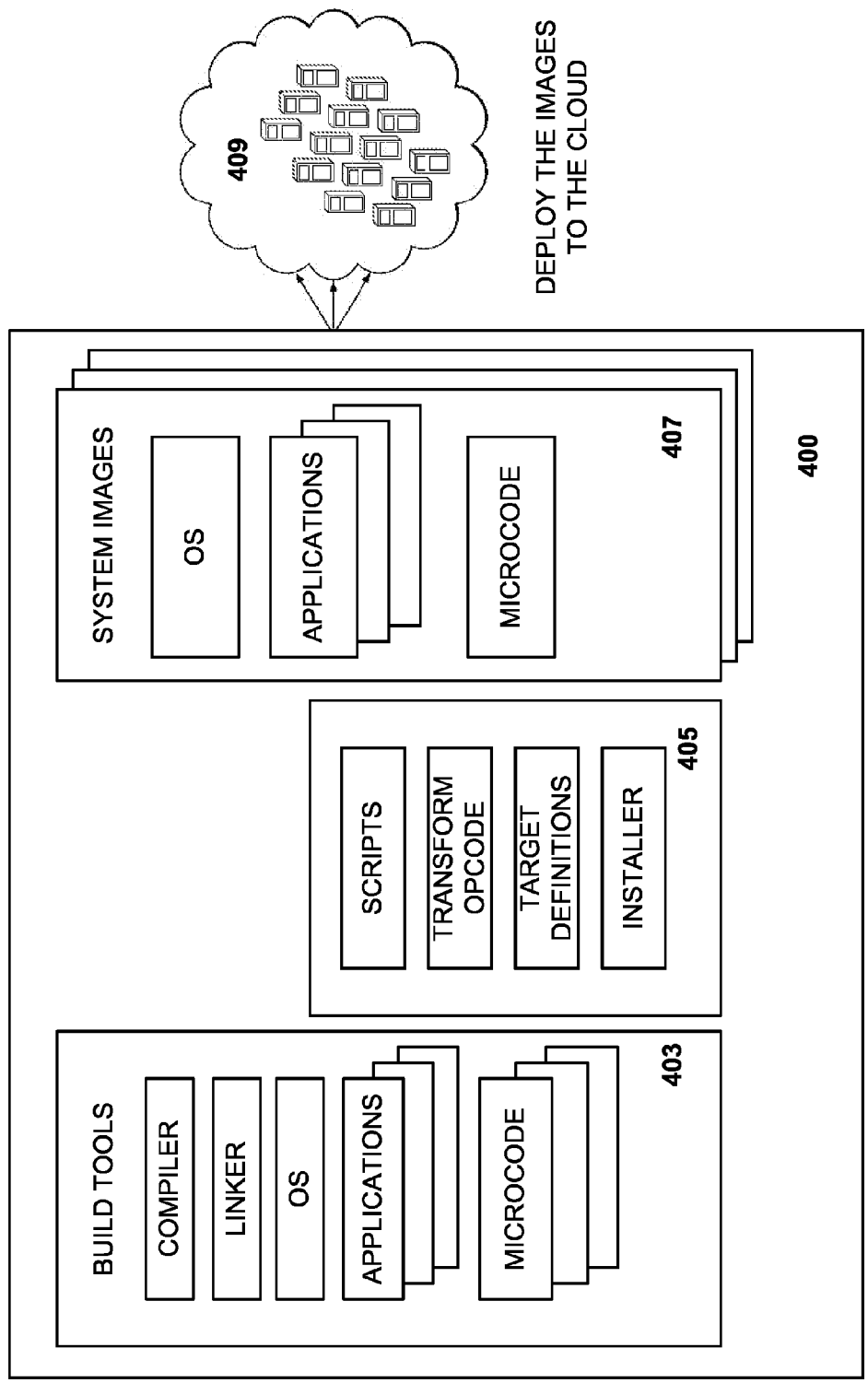
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 409. The appliance may be implemented using a data processing system such as described above with respect to FIG. 2. Preferably, the appliance 400 includes a set of build tools, including a compiler, linker and source code versions of the operating system and application 403. The appliance may also include a Web 2.0-based user interface (UI), a command line interface (CLI), and REST-based application programming interfaces (APIs). The appliance provides a management function that enables the rapid deployment of cloud-based solutions. To that end, the appliance provides install tools 405 e.g., scripts to manage operations, the transform code to change the opcodes of the operating system and applications, target definition data to manage user and group access to resources, as well as the installation code for transmitting the customized system images 407 to targets in the cloud 409.

In one preferred embodiment, the customized system images 407 contains a collection of system images and a collection of microcode. The installer and management system provides the target system in the cloud 409 the microcode deck and system image. In some embodiments of the invention, the installer and management system drives the microcode load and then boots the target system from the system image. In some embodiments of the invention, there is a one to many relationship between the microcode and the system images—one microcode deck may used multiple matching system images. In other embodiments of the invention, the same operating system and application may be used in multiple system images each system image having a different microcode. A given system image, on the other hand, is tied to one particular microcode deck and one particular set of operating system and application(s). A given application image can be sent to multiple targets.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

The appliance can be used to build a custom private cloud. The hardware, hypervisors and networking for the cloud are identified. Then, the user selects and customizes the virtual images. According to embodiments of the invention, this includes transforming the opcodes used by the operating system and applications to be included in the image. This process is described in greater detail below. Optionally, the user adds one or more script packages as needed to customize the deployed middleware environment. Next, the virtual systems are deployed to the cloud, either as an image on a hardware device or as a virtual machine.

The references herein to IBM Workload Deployer are exemplary and should not be taken to limit the disclosed technique, which may be implemented on any appliance (or, more generally, machine) having the general characteristics and operating functionality that has been described.

Softcore CPU

In the present invention, a soft microprocessor, also called a softcore CPU or a soft processor, has a reprogrammable microcode layer that can be used to replace the chip instruction set. By reprogramming the microcode, a preferred embodiment of the invention replaces the normal CPU op code with a different set. A soft microprocessor is a microprocessor core that can be wholly implemented using logic synthesis. It can be implemented via different semiconductor devices containing programmable logic (e.g., ASIC, FPGA, CPLD), including both high-end and commodity variations. There are a number of suitable commercially available softcore CPUs including Altera's Nios II processors, Xilinx's MicroBlaze processors, Lattice Semiconductor's LatticeMico32 processors or the open source OpenCores library of processors. While there are not minimum requirements for the processors, practically the processors need to be fast enough to be competitive with cloud hosted systems running normal CPUs. One advantage of the native approach or a virtual approach used in alternative embodiments of the invention is that the obfuscated code is being executed directly by the hardware (reprogrammed microcode and engine) rather than by a virtual CPU which would in turn be executed by microcode and the engine of the CPU its running on.

In respective embodiments of the invention, a cloud farm can be implemented with real or virtual versions of a selected soft core CPU. While the devices in the cloud farm can homogeneous or heterogeneous in different embodiments of the invention, it is easier to manage if all of the machines belonging to a particular customer to run a particular application are identical. There is an increased amount of security with a heterogeneous installation as the machines and corresponding code is different, and so in the unlikely event that a machine is compromised, it would be less likely to infect a dissimilar machine. The virtual embodiments of the invention are less efficient than the hardware based embodiments as there is an extra layer in which the virtual CPU has to translate the instruction set into something the hardware understands. The virtual embodiments also have a security exposure not found in the hardware embodiments. It is possible for a hacker to work out how to slip instructions as data (in the real CPUs well known OpCode set) past the virtual CPU and get the real CPU to execute it. With the hardware/native embodiment, this is not possible, as the OpCode set the CPU understands is unknown. The implementation for a virtual version would be different as well—instead of building microcode a virtual CPU is built for the new opcode set—much like a Java runtime environment.

Figure 5:
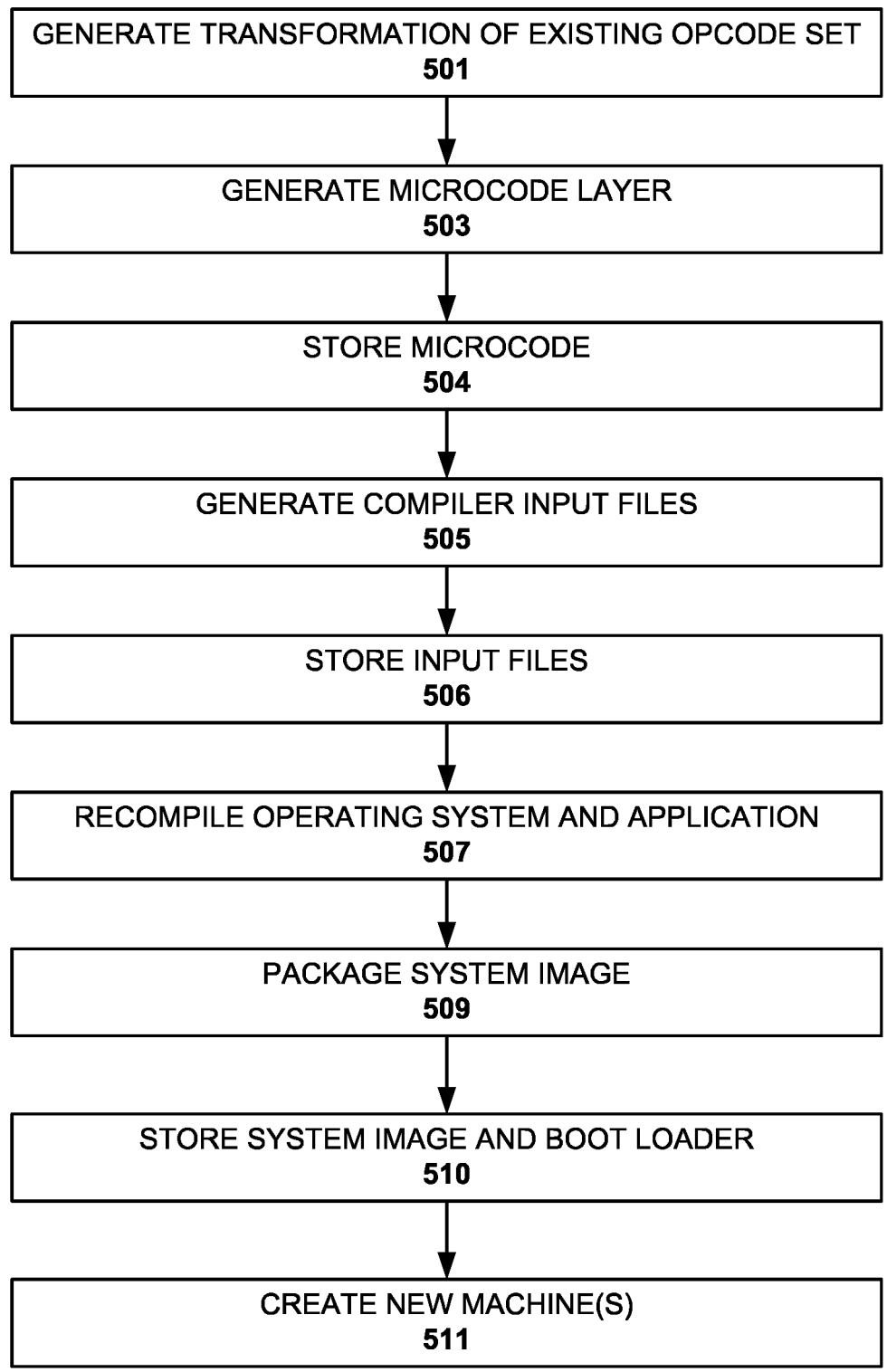
FIG. 5 is a flow diagram of one embodiment of the invention.

The general process of one embodiment of the invention is depicted in FIG. 5. As shown in the drawing, when an application is deployed to this cloud, in step 501, a transformation of an existing opcode set is generated. This transformation is, at its simplest, a mapping of the opcodes in the existing set to a new set of hex values. As is known to those skilled in the art, in computing, an opcode (abbreviated from operation code) is the portion of a machine language instruction that specifies the operation to be performed. Beside the opcode itself, instructions usually specify the data they will process, in form of operands. In addition to opcodes used in instruction set architectures of various CPUs, which are hardware devices, they can also be used in abstract computing machines as part of their byte code specifications. In step 503, based on this opcode transformation, a microcode layer is generated to implement the transformed opcode set on the reprogrammable CPU. Microcode is a layer of hardware-level instructions that implement higher-level machine code instructions or internal state machine sequencing in many digital processing elements. This microcode package, step 504, is stored on disk.

In step 505, based on the transformed opcode set, a set of files is generated for a compiler, such as the GCC compiler, that will allow the compiler to cross compile the operating system and application for the transformed opcode set. The set of files will include source code versions of the operating system and application(s) to be installed on the target server. GCC is a free software collection of compilers which supports many platforms and languages. One skilled in the art would appreciate that many alternative compilers exist that could be employed in alternative embodiments of the invention. The output of this step (506) is stored on disk.

Next, in step 507, the compiler to recompiles the operating system and application. In one preferred embodiment of the invention, a custom version of Linux is used which has been, cleaned up to remove any self-modifying code and a copy of the application. Self-modifying code works by writing opcodes encoded within the application into the program as executable instructions. Unless care has been taken that the appropriate opcodes values are generated during compilation and that the length of the resulting code segment is handled properly, in the present invention, the result of self-modification can be a corrupted program that will not function properly. In one preferred embodiment, multiple applications can be recompiled together for the machine. In the event of an update to the application or operating system, the changed source code is recompiled, the modules are relinked and a new system image is packaged.

In step 509, a new system image is packaged. This includes all of the recompiled code and is comprises a complete operating system with all needed applications installed and set to start running as soon as a system boots from it. It includes a recompiled boot loader that will work with the modified microcode and system image. The system image and boot loader are stored in step 510.

In step 511 a new machine is deployed. In one preferred embodiment, this operation comprises the following sub-steps: a) The hardware and some disk space is assigned by the cloud management software. b) The microcode deck stored in step 504 is loaded into the CPUs on the assigned hardware. c) The system image and boot loader stored in step 510 are copied onto the assigned DASD. d) The system is then booted, which causes the boot loader to be run by the hardware. e) It will then load and run the operating system. The operating system will, in turn, load and run the applications.

Once the application has initialized, any older machine that the new one is replacing may be shutdown and decommissioned.

In the event that a virus, worm or Trojan should penetrate the server, it will be inoperable as it is not written in the correct assembly language for the server's CPU. Although malware may still cause the application to crash or misbehave if the malware injection method resulted in malware code overwriting part of the application or any of the applications in storage data.

However, some embodiments offer even greater protection.

For additional protection, in some embodiments, the opcode transform could be generated for each cloud machine the application was deployed to. In this embodiment, a "cloud platform" would be the provider, for example, IBM SoftLayer which would provide the hardware with the reprogramable microcode. The deployment process shown in FIG. 5 would be more complex in other embodiments, tracking which machines were active and producing a different opcode set transform for each one. Each machine may also get different application workloads. In other embodiments of the invention, the opcode transform would simply be regenerated every few days, and the deployment server regularly replacing servers with ones running newer images based on a predetermined period of time. In yet other embodiments of the invention, the servers can be divided into sets of servers, wherein each set of servers receives a different opcode transform. The "set" can be defined as a set of one, so that each server receives a different opcode transform. The embodiments can be combined wherein each set of servers is refreshed with a new opcode transform on a periodic basis, based off of a last deployment time of the previous package, wherein more critical or accessible machines (to the Internet) could be refreshed on a more frequent basis. For example, servers supporting a higher level of service level agreement, e.g., a gold tier, could be refreshed on a more frequent basis than those on a lower level, e.g., a bronze tier. A service-level agreement (SLA) is a part of a service contract where a service is formally defined, e.g., scope, quality, responsibilities, and are often sold according to different levels of service. Still other embodiments include an intrusion detection system or Security information and event management (SIEM) application, where the deployment server reacts to an attempted or successful intrusion by a) restarting failed/compromised applications (the new image will be clean), b) updating firewalls to block servers that seem to be sending up 'poisoned' requests, c) updating firewalls to look for and block 'poisoned' packets. Simply generating a new transform may not be sufficient, unless the system administrator is certain that the machine has actually been compromised. The timer driven regeneration above is to protect against undetected compromises by replacing the compromised target machine with a clean one using a different opcode set.

Embodiments of the invention use reprogrammable CPUs in specialized hardware for a dedicated set of machines. Then, software, as described above, manages the deployment of applications onto that cloud.

The deployment software requires:

1) A implementation of an opcode set for the reprogrammable CPUs.

2) A copy of the source code of an operating system that has been modified to remove all self-modifying aspects. The self-modifying aspects are removed as a safeguard to prevent injecting unremapped opcodes which may crash the system. The source code allows, the operating system to be recompiled and run using the transformed opcode set. In one preferred embodiment, the operating system will be a Linux derivative.

3) The source code for an application which can run under that operating system and function in a cloud environment. In alternative embodiments, multiple applications can be compiled into the same system image.

4) The normal dev/build environment for the machine developing the system image. The dev/build environment would run on a normal Windows or Linux platform using existing development tools.

The changes needed to implement the invention are inserted into the build process, where knowledge is needed of the test and deployment environment. For test machines, the transform used would be the baseline one, i.e. it would build using an identity transformation so the test systems would run with the 'default' microcode. This is to make it easier for the developers to analyze dumps and traces from failures during test. For the production machines, the build environment would need to know how many distinct transformed sets of images needed to be produced. For each one, it would need to generate the transform, the microcode deck, the cross complier configuration, the cross compiled versions of the operating system, boot loader and all the application code. From this set of code, the build environment would generate the system images. The deployment engine would then detect that a microcode deck and a matching system image existed and deploy it to cloud hardware to a supplied list of target machines.

In the preferred embodiment, only the production systems should be accessible to customers, i.e. those with the running applications. In some embodiments, the production and deployment machines are in different clouds as the dev and build deployment machines.

In a preferred embodiment, the deployment machines keep track of the respective opcode mappings and the times of installation after the images has been deployed to the production machines. This is useful information, in the event of an update to the code or a new application be installed after the initial installation. For example, in one preferred embodiment, timed replacement using a new transformation is a scheduled event. For maintenance, after recompilation of the new image, the system administrator may choose from several options: a) rebuild the system image, deploy it and decommission the old machines—this is the most secure; or, b) have the server check with the dev environment to determine whether there are updates, if there are updates for it, ftp them over to it, stop the app, apply the updates and then restart it. The second option is less preferred than the first as it can cause application outages and will not clean up any unnoticed compromises.

If there is an update to the operating system or applications, in a preferred embodiment, a new image is provided. In much the same way as described herein, the new complete system image would be rebuilt and launched on the machine to run it. The machine(s) with the old code would be decommissioned as soon as their replacements were up and running.

As discussed above, and in greater detail below, when the deployment application is executed to generate a new image for the application, it will do the following:

1) Generate an opcode mapping:
    2) Generate the Microcode;
    3) Generate Cross Compiler Instructions;
    4) Cross Compile the Operating System and the Application;
    5) Package; and
    6) Create a new machine.
    1) Generate an Opcode Mapping To generate a remapping of the operations in the opcode set, the process begins with a new set of hex values. While any algorithm could be used to generate a new set of values, preferably, the new set of hex values should be fairly dissimilar from the last set used, i.e. either the original set or the last transformed set. Once the new set has been generated, a check that compares corresponding values for at least 50 or so of the most common opcodes can be performed to see that they actually get a new value under the new transform. For example, The 'Return to caller' instruction might be opcode 0x37 in the base instruction set; in the transformed opcode set, it could be 0xD3 For a simple opcode set, there are potentially 255 possible values for each operation, although values cannot be reused within the same set. So for 150 operations, the number of permutations is 255!/100!—an awful lot which is very many of possibilities. a sophisticated mu-byte opcode set, there are 2^16 or even 22 possible encodings for each operation.

The purpose of this opcode mapping to defeat code injection attacks (such as buffer overruns) where the attacker has no visibility of the code being run on the server they are attacking. Even if attackers know the cloud facility is running this obfuscation scheme, they have to guess at the opcode mapping and the applications crashes (visibly) if the attackers get it wrong. Hence, the attacker is limited in the number of trials they may make. Typically, there is a single test machine running the live application, and they are limited because their attempts become a visible denial of service attack which security software can track and block rather than allowing them to quietly take over the server.

Other embodiments of the invention offer additional security. One preferred embodiment of the invention provides multiple, alternate encodings for the same operation. For example, the Return to Caller opcode might be encoded as '0x45', '0xF3' and '0x9B'. This assists in making programs compiled using the opcodes less susceptible to statistical attack by reducing the apparent frequency of the most common operations. In one preferred embodiment, if these encodings have different byte lengths (e.g., '0x45' and '0X37B2') it makes structural analysis harder.

Statistical analysis is one tool used by hackers to find the most frequent opcodes in programs compiled using a normal compiler. Once the most frequent opcodes in the program compiled for an obfuscated platform are found, it is somewhat easy to match up in some fashion with the corresponding opcodes in the normal compiler. This is a well-known mechanism for attacking a simple substitution cypher. Preferred embodiments of the invention defends against statistical analysis by implementing multiple opcodes for common instructions, thus reducing the frequency of occurrence of any particular opcodes. Also by using opcodes of variable length, the preferred embodiment makes the analysis harder as a hacker would need to determine whether you're dealing with a meaningful sequence of 1, 2, 3 or 4 bytes before you can do the frequency analysis.

Structural analysis is another tool used by hackers. Using a copy of a well-known program compiled for a known platform, if a copy compiled for the obfuscated platform is available, the two can be compared. A direct comparison of the two copies yields the obfuscated values of the opcodes that appear in the normal program. The invention defends against this with variable length opcodes, multiple opcodes for the same operation, inserting nop codes, inserting garbage segments that are jumped over, making it difficult for an attacker to get a copy of a compiled obfuscated program.

Another embodiment of the invention provides multiple NOP opcodes, which can be placed within the code. In computer science, a NOP or NOOP (short for No Operation) is an instruction that does nothing. Inserting NOP opcodes helps disguise offsets and makes it harder to perform a structural analysis. Other embodiments provide multiple Branch Relative opcodes which can be used to jump over sequences of random garbage that can be spliced into the code, for the purpose of thwarting statistical and structural attacks.

The purpose of the alternate encoding approaches above is to provide a level of protection in the event that a hacker has somehow managed to obtain access to a production system or a copy of a compiled system image. Even though they have access to the system, they cannot inject running code into it as it is missing the compliers, linkers and debuggers necessary to generate code on it. The attacker does not know the opcode transform so he cannot build his own offline cross compiler.

By including some of the above steps, the security of the cloud machines is improved. Should an attacker know that the cloud facility was using a transformed opcode to compile their machine, it would be possible to reverse engineer the transformation by comparing programs compiled under the baseline identity transform with the same program compiled under the deployed transformation. By adding offsets and alternate encodings, it makes mapping between the two harder, and thus more time consuming. Thus, the attacker is delayed enough that the compromised machine will be replaced with one using a different transformation before the hacker can get a working cross compiler. At this point, the attacker must restart making his mapping.

The code would also be subject to standard cryptographic attack methods based on the relative frequency of the different opcodes in the compiled program. A similar technique is used to attack simple substitution cyphers in normal languages. By inserting fake instructions and having multiple encoding values for the same instruction, the resulting graph of opcode frequencies is not going to map directly to a graph of the normal frequency of opcodes for an untransformed program. Again, the aim is to increase the amount of time it takes an attacker to deduce the opcode transformation that has been applied.

2) Generate the Micro Code:

The existing sample microcode will then be copied and modified to produce a set of microcode that will implement the generated opcode set. The body of the instructions will remain the same. In one preferred embodiment, assembler source code is used. Assuming the source is an assembler or assembler-like source, it will need to be assembled to produce the microcode deck. To produce the assembler source, a program that generated the baseline assembler from a definition of an opcode mapping can be modified to produce the transformed opcode.

Note that in the preferred embodiment of the invention only the opcodes will be changed. The character encoding is separate and will remain in the original encoding, e.g., as ASCII.

3) Generate Cross Compiler Instructions:

The next step is to then generate a set of cross compilation files for a compiler, such as GCC. These allow the compiler to run on a 'normal' system and produce a version of the operating system and application that will run on the modified hardware or virtual machine. To compile and run a program using a cross-compiler involves several steps: First, the cross-compiler on the host machine is run to produce assembler files for the target machine. This requires header files for the target machine. Next, assemble the files produced by the cross-compiler. This can be accomplished either with an assembler on the target machine, or with a cross-assembler on the host machine. Next, link those files to make an executable. A linker on the target machine can be used, or a cross-linker on the host machine. Whichever machine is used, libraries and certain startup files (typically 'crt . . . o') for the target machine are needed.

It is most convenient to do all of these steps on the same host machine, since then all steps are performed with a single invocation of GNU CC. This requires a suitable cross-assembler and cross-linker. For some targets, the GNU assembler and linker are available.

4) Cross Compile the Operating System and the Application:

Cross compiling will produce a version of the operating system for a machine using the generated opcode set and a version of the application that will run on it. Cross compiling GCC requires that a portion of the target platform's C standard library be available on the host platform. The programmer may choose to compile the full C library, but this choice could be unreliable. The alternative is to use newlib, which is a small C library containing only the most essential components required to compile C source code.

The GNU autotools packages (i.e. autoconf, automake, and libtool) use the notion of a build platform, a host platform, and a target platform. The build platform is where the compiler is actually compiled. In most cases, build should be left undefined (it will default from host). The host platform is where the output artifacts from the compiler will be executed. The target platform is used when cross compiling cross compilers, it represents what type of object code the package itself will produce; otherwise the target platform setting is irrelevant.

5) Package:

Package the opcode implementation so that it can be loaded into the microcode of a machine. The tools are used for packaging would depend on the provider of the reprogrammable chip and the cloud provider. Typically, the package is built into a single 'flash update' file which will be transferred to somewhere the machine can read it and then loaded by the machine—along with warnings about not interrupting it or powering it off.

An installation image for the OS with the application is produced. This can be used to boot a machine that is running the new opcode set. In a preferred embodiment of the invention, a complete file structure for the machine is built on the dev/build system. It contains all the code in the right place within the file structure. This file structure is bundled into a single 'system image' file which, which when loaded onto a disk attached to the target machine will reproduce the exact same file system. In the preferred embodiment, a boot loader is included. A boot loader is a little bit of code that is compiled into the transformed opcode and will handle the very basics of loading the operating system until the boot loader can hand control over to it. Usually a single file that gets placed onto the hard disk of the target machine as its master boot record.

6) Create a New Machine:

The list of servers is obtained. The new native, hardware platform can be obtained from the cloud provider. First, the new machine is loaded with the opcode package. Then, the new machine is booted from the installation image (boot loader and system image) provided by the deployment engine.

Once the operating system and application are installed with the provided machine, the instances running on different opcode sets will work as the normal unmodified applications, as there are no opcodes included in the communication and all the machines are using the same word size, ending and character encoding set. Likewise, the machine will emit normal ASCII based html when serving data to a client web browser.

The benefits of this approach are many. The execution speed should be the same as for a system running the unmodified opcode set on the native hardware or virtual machine since most modern CPUs, e.g., existing x86 native hardware, are implemented with varying degrees of microcode. The system is protected against attacks by software injected via overrun or 'trick update' mechanisms. Although the attack may result in memory corruption, it is most likely that the application will simply crash when it hits the code—as opposed to executing it as it is supposed to do so. It is still vulnerable to data based attacks, however (e.g., HTML extended with SQL select statements).

The invention is designed to protect against a class of attacks that injects hostile code into the system. It is not designed to protect against higher level attacks that trick the system into executing larger data queries than was intended. For example, in the case of false credentials, the invention will stop someone from accessing data, but it will make it significantly harder for them to add to or modify the systems code to, for example, put a back door in place or gather data on transactions it is processing.

In the event that the cloud host or a hacker should take a copy of the boot image or a dump of the system, it is difficult to decompile the application as the preparation mechanism did not produce a decompiler for the opcode set it is written in. If a hacker can obtain a copy of a program compiled for the obfuscated platform and decompile it, they can discover the opcode mapping. By ensuring that there are no tools to decompile, debug or trace code execution in the deployed system images, it blocks the attacker from using this simple path to work around the obfuscation. Likewise, using the present invention ensures there are no tools that would allow them to easily copy code to another system (no FTP and the like), thus making it harder for an attacker to obtain samples of the obfuscated code for analysis.

Figure 6:
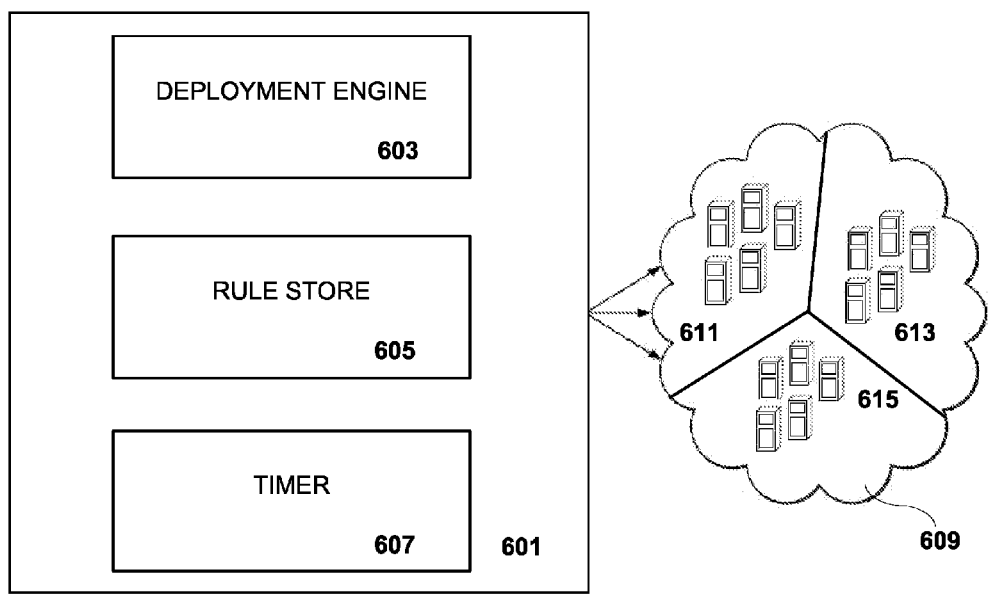
FIG. 6 illustrates a representative cloud management platform in which the techniques of this disclosure may be implemented.

FIG. 6 shows one preferred embodiment of the invention in which the cloud has been divided into set of host machines which receive different versions of the transformed system image. As shown, the deployment appliance 601 has a similar deployment engine 603 and associated code as that shown in FIG. 4. In FIG. 6, a rules store 605 containing sets of rules concerning how and how often the system images (not pictured) should be deployed to the target cloud servers in cloud 609. The deployment appliance also contains a timer or scheduler 607 for executing the rules 605. For purposes of illustration, the cloud servers are grouped in three groups 611, 613, 615 of equal size, but one skilled in the art that other numbers of groups of different sizes could be used in different embodiments of the invention. Each of the groups has a different set of opcode mappings and system images.

In one embodiment of the invention, the first group of servers 611 are assigned to the gold tier customers which have the most stringent security requirements. Thus, the rules 605 for the first group 611 require that the opcode mappings and system images be renewed on a frequent basis, for example, once a day. The rules could also require that each cloud server in the first group 611 receives its own individualized opcode mapping and system image. The second group of servers 613 are assigned to the silver tier customers, and have intermediate security level requirements. In this embodiment, the rules 605 for the second group of servers 613 require that the opcode mappings and system images be renewed on a less frequent basis, for example, once a week. The third group of servers 615 is assigned to bronze tier customers and have the least stringent security requirements. The rules 605 for the third group of servers require that the opcode mappings and system images be renewed on the least frequent basis. The rules could be that new transformed opcodes are only required when new versions of the application code is installed on the server 615. Those skilled in the art would appreciate that the rules in this embodiment are merely exemplary, and different sets of rules could be used in different embodiments of the invention.

Figure 7:
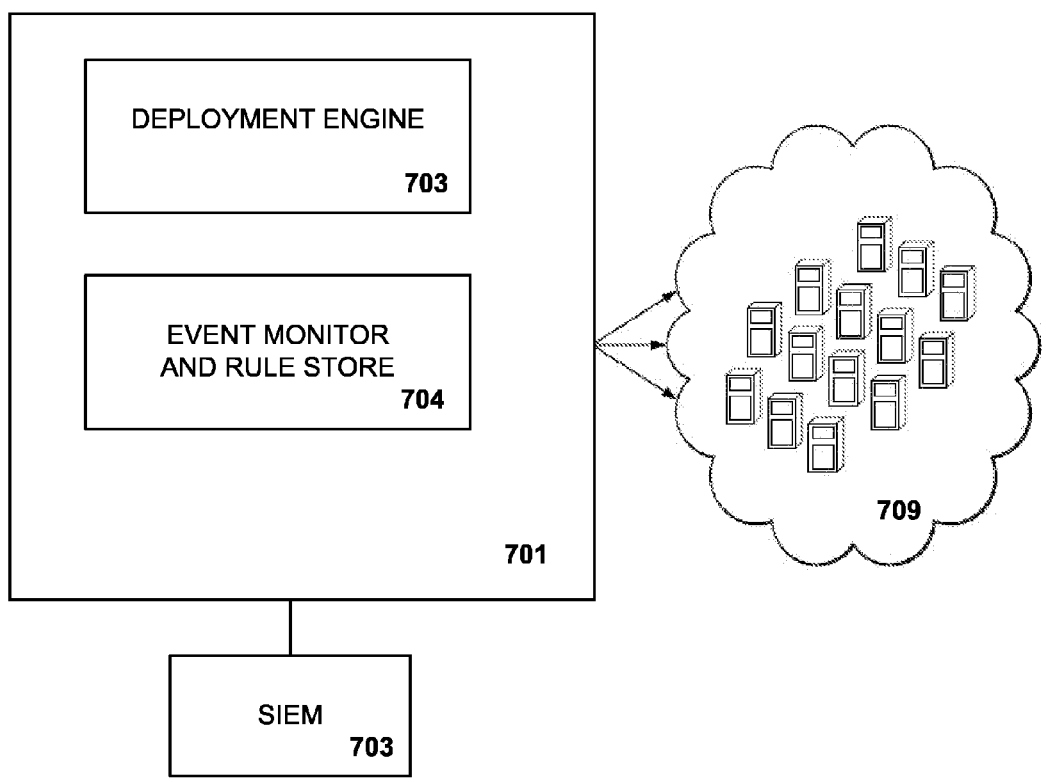
FIG. 7 illustrates a second representative cloud management platform in which an embodiment of the invention may be implemented.

In FIG. 7, another embodiment of the invention is shown. In this embodiment of the invention, the deployment appliance 701 is shown equipped with a deployment engine 703, Event Monitor and Rule Store 704 and a Security information and event management (SIEM) application 705. In this embodiment, after the initial deployment of system images (not pictured) to the cloud servers in the cloud 709, the Event Monitor and Rule Store 704 subscribes to events from the SIEM 705. The Event Monitor 704 will evaluate each received event against the rules to determine whether the event is one which will require a new opcode mapping and system image to be created and deployed to the cloud 709. Although in the drawing the cloud servers are shown in a single group, the servers could be heterogeneous with each type or group of server having a different opcode mapping and system image. Therefore, the event detected by the SIEM could apply to only one type or group of servers so that only that type or group of servers would have a new opcode mapping and system image.

Transforming Opcodes

The process of transforming opcodes is discussed in further detail below. Usually, each operation code has a specific numeric value associated to it, and that value is unique and well known within the processor family that has implemented it. Indeed, within IBM's current opcode set there are codes that were originally assigned in the 1960's. The values are kept the same to provide legacy compatibility between systems. If the codes had been changed, then the programs would all have had to be recompiled—a daunting task in the 1970's.

In this present invention, the process deliberately changes the opcodes in order to increase security. The machine image produced is comparatively small by today's standard. In one preferred embodiment, it is just a restricted, Linux based operating system, one or more applications and the minimum of middleware to support them, so it is viable to recompile the whole thing on a fairly regular basis.

A basic set of machine instructions is created, for example:

| Instruction | Definition |
|---|---|
| ReturnToCaller | Load instruction pointer from R14 |
| | Fetch next opcode |

Then, a baseline opcode mapping is created. For this example, a 4 byte (64 bit) encoding scheme is used. Those skilled in the art would appreciate that a shorter scheme—2 bytes (32 bits) or a hybrid scheme with a mixture of instruction lengths can be used in an embodiment of the invention. The 64-bit one is good for illustrative purposes, although a hybrid one would give better security.

| Instruction | OpCode |
|---|---|
| ReturnToCaller | '0x37000000' |

The microcode generated from this would simply detect that the current opCode is '0x37000000' and dispatch the indicated internal instructions, i.e. the load and the fetch. The baseline opcode mapping would be the one generated for debuggers and is used on test systems. It is generally not used on production systems.

The generation of the alternate opcode mappings would be done by first running an algorithm against an augmented version of the baseline opcode table. In a preferred embodiment, this would have information about the usual frequency with which the opcode occurred in normal code added to it.

| Instruction | OpCode | Frequency |
|---|---|---|
| ReturnToCaller | '0x37000000' | Very Common |

The generator would use the information in the augmented table to generate an alternate encoding, using randomly selected non-reused encoding values. For some instruction groups it may be necessary to use a set of associated values, but this depends upon the implementation of the microcode.

| Instruction | Opcodes |
|---|---|
| ReturnToCaller | '0x003050106', '0x703F72B3', '0xF701A2B8', '0x4539FE21', '0x9A3C07B3' |

The generated microcode would simply drive the actions for ReturnToCaller for any of the indicated OpCodes.

A simple variance checker that went through and calculated a weighted count of the number of instructions that had the same opcode in the baseline and the generated mapping could be used to reject mappings that were to similar to the baseline (or to any other already generated mapping).

In some preferred embodiments, the injection of NOP sequences and fake code with jump sequences would be performed when the cross compiler code was being generated. The instruction sequences to be generated would simply have these inserted into them in addition to the correct instructions. Ideally, this should be done in a probabilistic way, with each insertion being randomly determined each time the sequence was generated.

The above techniques work well when the cloud tenant is purchasing the use of a dedicated machines that it is the only user. Other embodiments of the invention work in a virtualized environment. However, relative to a hardware machine, there are some disadvantages. The first point to note is that the hardware CPU instruction set must be replaced. Using a virtual CPU to execute the machine is going to be slower as every instruction must be translated into the host machine operating code, before it can be processed by the host machine CPU. One advantage of the invention in the hardware embodiment is that the obfuscated CPUs run the code natively—as fast as a baseline implementation with no additional translation steps. In the virtual environment, there is also the danger that a hacker will be able to trick the host CPU into branching into what is identified in the virtual machine as a data area—which may contain code written for the host machine that was introduced as data.

In one embodiment of the invention, a multi-CPU system with a hypervisor could be used provided that the server had one or more reprogrammable CPUs. Each reprogrammable CPU would be loaded with the respective, appropriate microcode set and then virtual machines could be loaded with system images that used the corresponding microcode set. Each virtual machine would only be dispatchable to a CPU that had the appropriate set of microcode loaded, so while this embodiment is more secure than using the same microcode for all of the CPUs, some of the benefits of virtualization could be lost.

For example, to illustrate this embodiment of the invention, four CPUs are loaded as shown below:

| CPU | Microcode |
|-----|-----------|
| 1 | SET A |
| 2, 3 | SET B |
| 4 | SET C |

Then with 10 virtual machines running, there would have potential load balancing issues as not all CPUs could dispatch all workloads:

| Microcode | VMs | CPUs |
|-----------|-----|------|
| SETA | A, B, C, D, E | 1 |
| SETB | F, G | 2, 3 |
| SETC | H, I, J, K, L, M, N | 4 |

Even if CPUs 2 and 3 were idle, they could not be dispatched to process work on VMs using other microcode sets, so the situation can exist where CPU 4 is the only CPU doing any work and getting poor throughput because it is the only CPU that can do any work. If the user only uses a single microcode set within the machine, the problem would be avoided, but switching to a new microcode set would require a second machine or a coordinated migration of systems and CPUs within the one machine.

While a preferred operating environment and use case (a cloud deployment appliance or platform) has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

In the above description, a preferred approach is to apply the remediation policy to a cloud application package (typically one of a set of cloud application packages in a catalog of such application packages) in response to discovery of a new problem (a defect or vulnerability). This is not a requirement, however, as the technique may be implemented in other contexts, e.g., when a cloud application package is being deployed for the first time.

Having described our invention, what we now claim is as follows.

The invention claimed is:

1. A method for obfuscating CPU operation codes in a set of machines operating in a distributed computing environment comprising:
   providing a reprogrammable microcode layer to replace a hardware instruction set, the reprogrammable microcode layer containing a set of original operation codes;
   generating a first transform of the set of original operation codes producing a first set of transformed operation codes;
      generating a first transformed microcode which incorporates the first set of transformed operation codes instead of the original operation codes;
      compiling an operating system and an application using the first set of transformed operation codes to produce a first cross compiled operating system and application;
      deploying the first transformed microcode, the first cross compiled operating system and application to a respective first one of the set of machines, the first one of the machines equipped with a softcore processor;
      generating a second transform of the set of operation codes producing a second set of transformed operation codes and a second transformed microcode which incorporates the second set of transformed operation codes instead of the original operation codes;
      compiling an operating system and an application using the second set of transformed operation codes to produce a second cross compiled operating system and application;
      deploying the second transformed microcode, the second cross compiled operating system and application to a respective second one of the set of machines, the second one of the machines equipped with a softcore processor; and
      wherein the generating, compiling and deploying are repeated on a periodic basis, each cycle using a new set of transformed operation codes.

2. The method as recited in claim 1 further comprising:
   in response to an event, generating a third transform of the set of operation codes producing a third set of transformed operation codes and a third transformed microcode which incorporates the third set of transformed operation codes instead of the original operation codes;
   compiling an operating system and an application using the third set of transformed compiler files to produce a third cross compiled operating system and application; and
   deploying third transformed microcode, the third cross compiled operating system and application to the respective first one of the set of machines.

3. The method as recited in claim 1, wherein the first microcode has been hardened by one or more techniques selected from the group consisting of providing multiple, alternate encodings in the transformed operation codes for a first operation code in the original operation codes, providing multiple No Operation operation codes in the transformed operation codes, and providing multiple Branch Relative operation codes in the transformed operation codes.

4. The method as recited in claim 1, wherein the set of machines is operating in a cloud environment and the set of machines is grouped into a first and a second subsets of machines each having a plurality of machines, wherein the deploying is repeated for each machine in the first and the second subsets, wherein the first transformed microcode, the first cross compiled operating system and application are deployed to the first subset of machines and wherein the second transformed microcode, the second cross compiled operating system and application are deployed to the second subset of machines.

5. The method as recited in claim 2, wherein the event is selected from the group of a detected intrusion, a successful intrusion or an expiration of a predetermined period of time from a last deployment of a transformed microcode, a cross compiled operating system and application.

6. The method as recited in claim 1, wherein the generating, compiling and deploying are repeated on a more frequent periodic basis for a set of critical machines than for a set of noncritical machines.

7. Apparatus, comprising: a set of machines including a first machine with a first processor and a first computer memory;
   the first computer memory holding computer program instructions executed by the first processor to deploy system images to others of the set of machines, the computer program instructions comprising:
      program code, operative for providing a reprogrammable microcode layer to replace a hardware instruction set, the reprogrammable microcode layer containing a set of original operation codes;
      program code, operative for generating a first transform of the set of original operation codes producing a first set of transformed operation codes;
      program code, operative for generating a first transformed microcode which incorporates the first set of transformed operation codes instead of the original operation codes;
      program code, operative for compiling an operating system and an application using the first set of transformed operation codes to produce a first cross compiled operating system and application;
      program code, operative for deploying a system image including the first transformed microcode, the first cross compiled operating system and application to a respective first one of the set of machines, the first one of the machines equipped with a softcore processor;
      program code, operative for generating a second transform of the set of operation codes producing a second set of transformed operation codes and a second transformed microcode which incorporates the second set of transformed operation codes instead of the original operation codes;
      program code, operative for compiling an operating system and an application using the second set of transformed operation codes to produce a second cross compiled operating system and application;
      program code, operative for deploying the second transformed microcode, the second cross compiled operating system and application to a respective second one of the set of machines, the second one of the machines equipped with a softcore processor; and
      wherein the program code for generating, compiling and deploying when executed are executed on a periodic basis, each cycle using a new set of transformed operation codes.

8. The apparatus as recited in claim 7 further comprising:
program code, operative in response to an event for generating a third transform of the set of operation codes producing a third set of transformed operation codes and a third transformed microcode which incorporates the third set of transformed operation codes instead of the original operation codes;
program code, operative for compiling an operating system and an application using the third set of transformed compiler files to produce a third cross compiled operating system and application; and
program code, operative for deploying third transformed microcode, the third cross compiled operating system and application to the respective second one of the set of machines.

9. The apparatus as recited in claim 7, wherein the first microcode has been hardened by one or more techniques selected from the group consisting of providing multiple, alternate encodings in the transformed operation codes for a first operation code in the original operation codes, providing multiple No operation operation codes in the transformed operation codes, and providing multiple Branch Relative operation codes in the transformed operation codes.

10. The apparatus as recited in claim 7, wherein the set of machines is comprises a plurality of machines operating in a cloud environment and the set of machines is grouped into a first and a second subsets of machines each having a plurality of machines, wherein the deploying is repeated for each machine in the first and the second subsets, wherein the first transformed microcode, the first cross compiled operating system and application are deployed to the first subset of machines and wherein the second transformed microcode, the second cross compiled operating system and application are deployed to the second subset of machines.

11. The apparatus as recited in claim 7, wherein the event is selected from the group of a detected intrusion, a successful intrusion or an expiration of a predetermined period of time from a last deployment of a transformed microcode, a cross compiled operating system and application.

12. A computer program product in a non-transitory computer readable medium for use in a data processing system, the computer program product holding computer program instructions executed by the data processing system to deploy system images to a set of machines, the computer program instructions comprising:
program code, operative for providing a reprogrammable microcode layer to replace a hardware instruction set, the reprogrammable microcode layer containing a set of original operation codes;
program code, operative for generating a first transform of the set of original operation codes producing a first set of transformed operation codes;
program code, operative for generating a first transformed microcode which incorporates the first set of transformed operation codes instead of the original operation codes;
program code, operative for compiling an operating system and an application using the first set of transformed operation codes to produce a first cross compiled operating system and application;
program code, operative for deploying a system image including the first transformed microcode, the first cross compiled operating system and application to a respective first one of the set of machines, wherein the first one of the machines is equipped with a softcore processor;
program code, operative for generating a second transform of the set of operation codes producing a second set of transformed operation codes and a second transformed microcode which incorporates the second set of transformed operation codes instead of the original operation codes;
program code, operative for compiling an operating system and an application using the second set of transformed operation codes to produce a second cross compiled operating system and application;
program code, operative for deploying the second transformed microcode, the second cross compiled operating system and application to a respective second one of the set of machines, the second one of the machines equipped with a softcore processor; and
wherein the program code for generating, compiling and deploying when executed are executed on a periodic basis, each cycle using a new set of transformed operation codes.

13. The computer program product as recited in claim 12 further comprising:
program code, operative in response to an event for generating a third transform of the set of operation codes producing a third set of transformed operation codes and a third transformed microcode which incorporates the third set of transformed operation codes instead of the original operation codes;
program code, operative for compiling an operating system and an application using the third set of transformed compiler files to produce a third cross compiled operating system and application; and
program code, operative for deploying third transformed microcode, the third cross compiled operating system and application to the respective first one of the set of machines.

14. The computer program product as recited in claim 12, wherein the first microcode has been hardened by one or more techniques selected from the group consisting of providing multiple, alternate encodings in the transformed operation codes for a first operation code in the original operation codes, providing multiple No operation operation codes in the transformed operation codes, and providing multiple Branch Relative operation codes in the transformed operation codes.

15. The computer program product as recited in claim 12, further comprising:
program code, operative for grouping the set of machines into a first and a second subsets of machines each having a plurality of machines;
program code operative for deploying the first transformed microcode, the first cross compiled operating system and application are to the first subset of machines and for deploying the second transformed microcode, the second cross compiled operating system and application to the second subset of machines.

16. The computer program product as recited in claim 13, wherein the event is selected from the group of a detected intrusion, a successful intrusion or an expiration of a predetermined period of time from a last deployment of a transformed microcode, a cross compiled operating system and application.

* * * * *